United States Patent
Huang-Fu et al.

(10) Patent No.: US 10,708,190 B2
(45) Date of Patent: *Jul. 7, 2020

(54) CONTROL OF MAXIMUM TRANSMISSION UNIT SIZE DISCOVERY USING AT COMMANDS

(71) Applicant: HFI Innovation Inc., Hsinchu County (TW)

(72) Inventors: Chien-Chun Huang-Fu, Hsinchu (TW); Weirong Chu, New Taipei (TW); Yu-Syuan Jheng, Taipei (TW)

(73) Assignee: HFI Innovation INC., Hsin-Chu (TW)

(*) Notice: Subject to any disclaimer, the term of this patent is extended or adjusted under 35 U.S.C. 154(b) by 0 days.

This patent is subject to a terminal disclaimer.

(21) Appl. No.: 16/170,035

(22) Filed: Oct. 25, 2018

(65) Prior Publication Data

US 2019/0068514 A1 Feb. 28, 2019

Related U.S. Application Data

(63) Continuation of application No. 15/005,285, filed on Jan. 25, 2016, now Pat. No. 10,142,251.

(Continued)

(51) Int. Cl.
*H04L 12/805* (2013.01)
*H04L 29/06* (2006.01)
(Continued)

(52) U.S. Cl.
CPC .......... *H04L 47/365* (2013.01); *H04L 29/08* (2013.01); *H04L 45/121* (2013.01); *H04L 47/36* (2013.01);
(Continued)

(58) Field of Classification Search
CPC .............................. H04L 47/365; H04L 47/36
See application file for complete search history.

(56) References Cited

U.S. PATENT DOCUMENTS 7,304,959 B1   12/2007   Swaroop et al. ............. 370/252
2004/0125774 A1   7/2004   Hoyt .............................. 370/338
(Continued)

FOREIGN PATENT DOCUMENTS

CN   1599361 A   9/2003
CN   101663864 A   3/2007
(Continued)

OTHER PUBLICATIONS

SIPO, search report for the CN patent application 201680001575.2 (non English translation is available) dated Jul. 3, 2019 (6 pages).
(Continued)

*Primary Examiner* — Jeffrey M Rutkowski
*Assistant Examiner* — Chae S Lee
(74) *Attorney, Agent, or Firm* — Imperium Patent Works; Zheng Jin

(57) ABSTRACT

A method of control Maximum Transmission Unit (MTU) reporting and discovery using AT commands is proposed. In communications networks, the MTU of a communication protocol of a layer is the size (in bytes or octets) of the largest protocol data unit that the layer can pass onwards. In an IP network, IP packets may be fragmented if the supported MTU size is smaller than the packet length. In accordance with one novel aspect, the packet data protocol (PDP) context of a packet data network (PDN) connection comprises MTU information. By introducing MTU information to the PDP contexts, TE can use AT commands to query MTU parameters from the network and thereby avoid fragmentation. TE can also use AT command to set MTU parameters and thereby control MTU discovery.

20 Claims, 10 Drawing Sheets

Related U.S. Application Data

(60) Provisional application No. 62/107,587, filed on Jan. 26, 2015.

(51) Int. Cl.
*H04L 12/727* (2013.01)
*H04W 28/12* (2009.01)
*H04W 72/04* (2009.01)
*H04L 29/08* (2006.01)
*H04W 28/18* (2009.01)

(52) U.S. Cl.
CPC .......... *H04L 69/166* (2013.01); *H04W 28/12* (2013.01); *H04W 72/0426* (2013.01); *H04W 28/18* (2013.01)

(56) References Cited

U.S. PATENT DOCUMENTS

| | | | |
|---|---|---|---|
| 2009/0003241 A1 | 1/2009 | Teng | 370/254 |
| 2010/0272030 A1 | 10/2010 | Babbar | 370/329 |
| 2011/0090851 A1 | 4/2011 | Khalil et al. | 370/328 |
| 2011/0235614 A1 | 9/2011 | Lerzer et al. | 370/331 |
| 2011/0243063 A1 | 10/2011 | Kuningas | 370/328 |
| 2011/0305143 A1 | 12/2011 | Gray et al. | 370/242 |
| 2012/0082095 A1 | 4/2012 | Sun et al. | 370/328 |
| 2012/0281559 A1 | 11/2012 | Ner et al. | 370/252 |
| 2014/0301395 A1 | 10/2014 | Khanal et al. | 370/392 |
| 2015/0071067 A1 | 3/2015 | Martin et al. | 370/235 |
| 2015/0195743 A1 | 7/2015 | Sirotkin et al. | 370/235 |
| 2016/0021062 A1 | 1/2016 | Pan | 726/13 |

FOREIGN PATENT DOCUMENTS

| | | |
|---|---|---|
| CN | 102165837 A | 9/2008 |
| CN | 102036304 A | 9/2009 |
| EP | 1579653 A2 | 12/2002 |
| EP | 1517511 A1 | 9/2003 |
| EP | 1879333 A1 | 7/2006 |
| EP | 2164208 A1 | 9/2008 |
| WO | WO03084145 A1 | 3/2002 |
| WO | WO2004059909 A2 | 12/2002 |
| WO | WO2010095028 A2 | 2/2009 |
| WO | WO2010129231 A1 | 11/2010 |

OTHER PUBLICATIONS

3GPP TS 27.007 V12.7.0 (Dec. 2014), 3rd Generation Partnership Project; Technical Specification Group Core Network and Terminals; AT Command Set for User Equipment (UE) (Release 12).

International Search Report and Written Opinion of International Search Authority for PCT/CN2016/072152 dated Mar. 11, 2016 (11 pages).

Yang et al., Using GPRS Module in Embedded Systems, Nanjing University et al., Computing Technology and Automation vol. 25, No. 4, Dec. 2006 (English translation in abstract only).

International Search Report and Written Opinion of International Search Authority for PCT/CN2016/072154 dated Apr. 8, 2016 (11 pages).

International Search Report and Written Opinion of International Search Authority for PCT/CN2016/072153 dated Apr. 28, 2016(11 pages).

USPTO, Office Action for related U.S. Appl. No. 15/005,329 dated Feb. 24, 2017 (11 pages).

Cisco, Adjusting IP MTU, TCP MSS, and PMTUD on Windows and Sun Systems, Aug. 10, 2005 <Document ID: 13709> (10 pages).

EPO, search report for the EP patent application 16742741.8 dated Jan. 25, 2018 (11 pages).

Collin Mulliner et al., "Taming Mr Hayes: Mitigating Signaling Based Attacks on Snnartphones", Dependable Systems and Networks (DSN), 2012 42nd annual IEEE/IFIP International Conference on, IEEE, Jun. 25, 2012 (12 pages).

EPO, search report for the EP patent application 16742740.0 dated Mar. 1, 2018 (12 pages).

Digital cellular telecommunications system (Phase 2+); Universal Mobile Telecommunications System (UMTS); LTE; AT command set for User Equipment (UE) (3GPP TS 27.007 version 12.7.0 Release 12), Jan. 1, 2015, the whole document.

| COMMAND | POSSIBLE RESPONSE(S) |
|---|---|
| +CGCONTRDP[=<cid>]<br>(READ) | [+CGCONTRDP: <cid>,<bearer_id>,<apn>[,<local_addr and subnet_mask><br>[,<gw_addr>[,<DNS_prim_addr>[,<DNS_sec_addr>[,<P-CSCF_prim_addr><br>[,<P-CSCF_sec_addr>[,<IM_CN_Signalling_Flag>[,<LIPA_indication><br>[,<IPv4_MTU>]]]]]]]]]<br>[<CR><LF>+CGCONTRDP: <cid>,<bearer_id>,<apn>[,<local_addr and subnet_mask><br>[,<gw_addr>[,<DNS_prim_addr>[,<DNS_sec_addr>[,<P-CSCF_prim_addr><br>[,<P-CSCF_sec_addr>[,<IM_CN_Signalling_Flag>[,<LIPA_indication><br>[,<IPv4_MTU>]]]]]]]]]<br>[...]] |
| +CGCONTRDP=?<br>(TEST) | CGCONTRDP: (list of <cid>s associated with active contexts) |

FIG. 5

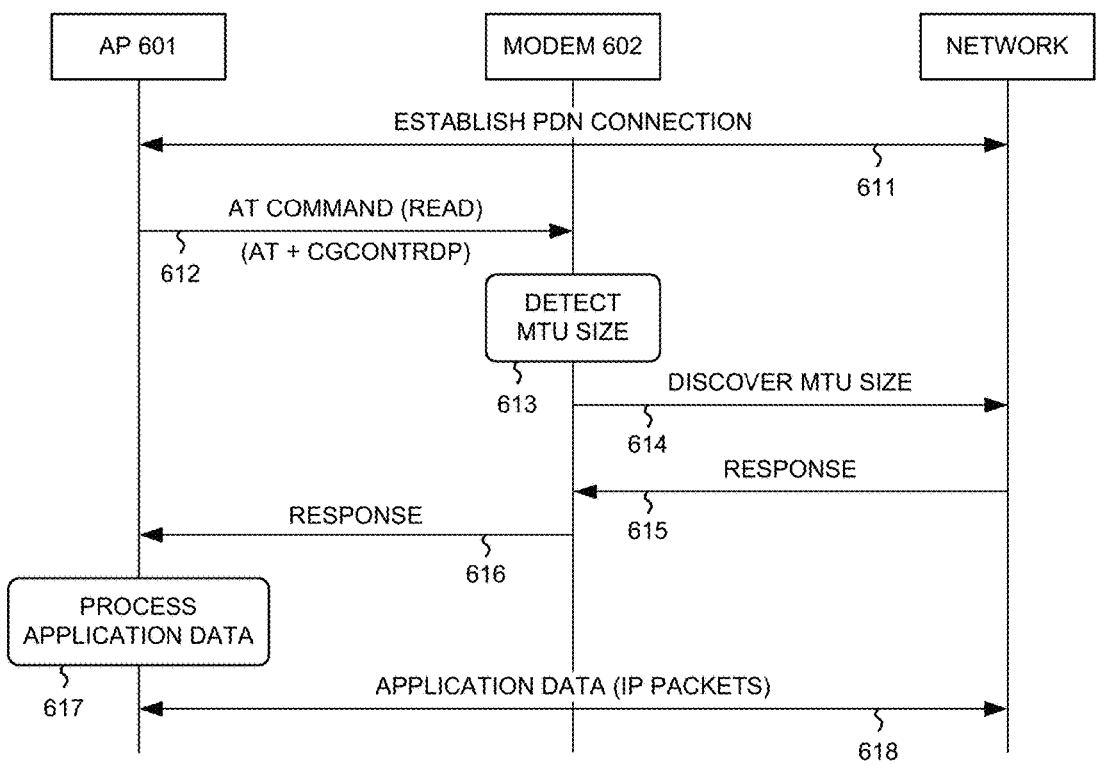

FIG. 6

| COMMAND | POSSIBLE RESPONSE(S) |
|---|---|
| +CGDCONT=[<cid>[,<PDP_type>[,<APN>[,<PDP_addr>[,<d_comp>[,<h_comp>[,<IPv4AddrAlloc>[,<request_type>[,<P-CSCF_discovery>[,<IM_CN_Signalling_Flag_Ind>[,<NSLPI>[,<securePCO>[,<IPv4_MTU_req>]]]]]]]]]]]]]<br>(SET) | |
| +CGDCONT?<br>(READ) | [+CGDCONT: <cid>,<PDP_type>,<APN>,<PDP_addr>,<d_comp>,<h_comp>[,<IPv4AddrAlloc>[,<request_type>[,<P-CSCF_discovery>[,<IM_CN_Signalling_Flag_Ind>[,<NSLPI>[,<securePCO>[,<IPv4_MTU_req>]]]]]]]]<br>[<CR><LF>+CGDCONT: <cid>,<PDP_type>,<APN>,<PDP_addr>,<d_comp>,<h_comp>[,<IPv4AddrAlloc>[,<request_type>[,<P-CSCF_discovery>[,<IM_CN_Signalling_Flag_Ind>[,<NSLPI>[,<securePCO>[,<IPv4_MTU_req>]]]]]]]]<br>[...]] |
| +CGDCONT=?<br>(TEST) | +CGDCONT: (range of supported <cid>s),<PDP_type>,,,(list of supported <d_comp>s),(list of supported <h_comp>s),(list of supported <IPv4AddrAlloc>s),(list of supported <request_type>s),(list of supported <P-CSCF_discovery>s),(list of supported <IM_CN_Signalling_Flag_Ind>s) ,(list of supported <NSLPI>s),(range of supported <securePCO>s),(list of supported <IPv4_MTU_req>s)<br><br>[<CR><LF>+CGDCONT: (range of supported <cid>s),<PDP_type>,,,(list of supported <d_comp>s),(list of supported <h_comp>s),(list of supported <IPv4AddrAlloc>s),(list of supported <request_type>s),(list of supported <P-CSCF_discovery>s),(list of supported <IM_CN_Signalling_Flag_Ind>s) ,(list of supported <NSLPI>s),(range of supported <securePCO>s),(list of supported <IPv4_MTU_req>s)<br>[...]] |

FIG. 9

CONTROL OF MAXIMUM TRANSMISSION UNIT SIZE DISCOVERY USING AT COMMANDS

CROSS REFERENCE TO RELATED APPLICATIONS

This application is a continuation, and claims priority under 35 U.S.C. § 120 from nonprovisional U.S. patent application Ser. No. 15/005,285, entitled "Control of Maximum Transmission Unit Size Discovery Using AT Commands", filed on Jan. 25, 2016, the subject matter of which is incorporated herein by reference. U.S. application Ser. No. 15/005,285, in turn, claims priority under 35 U.S.C. § 119 from U.S. Provisional Application No. 62/107,587 filed on Jan. 26, 2015, the subject matter of which is incorporated herein by reference.

TECHNICAL FIELD

The disclosed embodiments relate generally to wireless communication, and, more particularly, to method for controlling maximum transmission unit (MTU) size reporting and discovery using AT commands.

BACKGROUND

In communications networks, the maximum transmission unit (MTU) of a communication protocol of a layer is the size (in bytes or octets) of the largest protocol data unit that the layer can pass onwards. MTU parameters usually appear in association with a communications interface. Standards can fix the size of an MTU; or systems may decide MTU at connect time. A larger MTU brings greater efficiency because each network packet carries more user data while protocol overheads remain fixed, resulting higher efficiency means an improvement in bulk protocol throughput. A larger MTU also means processing fewer packets for the same amount of data. In some systems, per-packet-processing can be a critical performance limitation. However, larger packets occupy a slow link for more time than a smaller packet, causing greater delays to subsequent packets, and increasing lad and minimum latency. For example, a 1500-byte packet, the largest allowed by Ethernet at the network layer, ties up a 14.4 k modem for about one second. Large packets are also problematic in the presence of communication errors. Corruption of a single bit in a packet requires that the entire packet be retransmitted. At a given bit error rate, larger packets are more likely to be corrupt.

In an IP network, the Internet Protocol works over many networking technologies, each of which may use packets of different size. While a host will know the MTU of its own interface and possibly that of its peers from initial handshakes, it will not initially know the lowest MTU in a chain of links to any other peers. Another problem is that higher-layer protocols may create packets larger than a particular link supports. To get around this issue, IPv4 allows fragmentation: dividing the datagram into pieces, each small enough to pass over the single link that is being fragmented for, using the MTU parameter configured for that interface. This fragmentation process takes place at the IP layer and marks packets it fragments so that the IP layer of the destination host knows it should reassemble the packets into the original datagram. This method, however, implies a number of possible drawbacks including increased overhead.

The Internet Protocol defines the Path MTU of an Internet transmission path as the smallest MTU of any of the IP hops of the path between a source and destination. The path MTU is the largest packet size that can traverse this path without suffering fragmentation. Path MTU discovery is a technique for determining the path MTU between two IP hosts. It works by setting the DF (Don't Fragment) option in the IP headers of outgoing packets. Any device along the path whose MTU is smaller than the packet will drop such packets and send back an ICMP "Destination Unreachable" message containing its MTU. This information allows the source host to reduce its assumed path MTU appropriately. The process repeats until the MTU becomes small enough to traverse the entire path without fragmentation.

The wireless cellular communications network has grown exponentially over the years. A Long-Term Evolution (LTE) system offers high peak data rates, low latency, improved system capacity, and low operating cost resulting from simplified network architecture. LTE systems, also known as the 4G system, also provide seamless integration to older wireless network, such as GSM, CDMA and Universal Mobile Telecommunication System (UMTS). The $3^{rd}$ generation partner project (3GPP) network normally includes a hybrid of 2G/3G/4G systems. With the optimization of the network design, many improvements have developed over various standards, especially in providing wireless IP services via an Evolved Packet System (EPS).

The EPS/IP bearer and connection management and allocation functionality can be provided towards the applications and the terminal devices using an Application Programming interface (API). For external applications, the EPS/IP bearer and connection management and allocation functionality may be provided through an AT command API in accordance with 3GPP TS 27.007 "AT command set for User Equipment (UE)". AT commands are used for controlling Mobile Termination (MT) functions and GSM/UMTS network services from a Terminal Equipment (TE) through Terminal Adaptor (TA).

A solution is sought for controlling MTU size reporting and discovery for UEs in an IP network via the use of AT commands.

SUMMARY

A method of control Maximum Transmission Unit (MTU) reporting and discovery using AT commands is proposed. In communications networks, the MTU of a communication protocol of a layer is the size (in bytes or octets) of the largest protocol data unit that the layer can pass onwards. In an IP network, IP packets may be fragmented if the supported MTU size is smaller than the packet length. In accordance with one novel aspect, the packet data protocol (PDP) context of a packet data network (PDN) connection comprises MTU information. By introducing MTU information to the PDP contexts, TE can use AT commands to query MTU parameters from the network and thereby avoid fragmentation. TE can also use AT command to set MTU parameters and thereby control MTU discovery.

In one embodiment, a terminal equipment (TE) establishes a packet data network (PDN) connection in a mobile communication network. The TE transmits an AT command related to maximum transmission unit (MTU) information of the PDN connection. The TE receives an MTU size from a mobile termination (MT). Finally, the TE processes application data associated with the PDN connection and generates IP packets based on the MTU size received from the MT.

In another embodiment, a mobile termination (MT) receives an AT command from a terminal equipment (TE) in a mobile communication network. The AT command is related to maximum transmission unit (MTU) information of a packet data network (PDN) connection. The MT discovers an MTU size of the PDN connection based on an MTU discovery option. Finally, the MT transmits the MTU size from the MT to the TE.

In another embodiment, a mobile termination (MT) discovers a maximum transmission unit (MTU) size of packet data network (PDN) connection in a mobile communication network. The MT determines whether the MTU size has changed. The MT also determines whether MTU reporting is enabled by a terminal equipment (TE). The MT transmits an updated MTU size to the TE via an unsolicited result code (URC) if the MTU size has changed and if MTU reporting is enabled by the TE.

In yet another embodiment, a UE establishes a packet data network (PDN) connection in a mobile communication network. The UE transmits an AT command from an AP to a modem. The AT command is related to maximum transmission unit (MTU) information of the PDN connection. The UE discovers an MTU size of the PDN connection by the modem based on an MTU discovery option. Finally, the UE processes application data associated with the PDN connection and generates IP packets based on the MTU size received from the network.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 5 illustrates one embodiment of an AT command +CGCONTRDP for acquiring a list of Packet Data Protocol (PDP) context parameters including MTU size for each IP connection associated with a context identification (CID) in accordance with one novel aspect.

FIG. 6 illustrates a message flow between a TE and an MT for querying MTU information by the TE.

FIG. 9 illustrates one embodiment of an AT command +CGDCONT for setting/reading/testing a list of Packet Data Protocol (PDP) context parameters including MTU discovery option in accordance with one novel aspect.

DETAILED DESCRIPTION

Reference will now be made in detail to some embodiments of the invention, examples of which are illustrated in the accompanying drawings.

Figure 1:
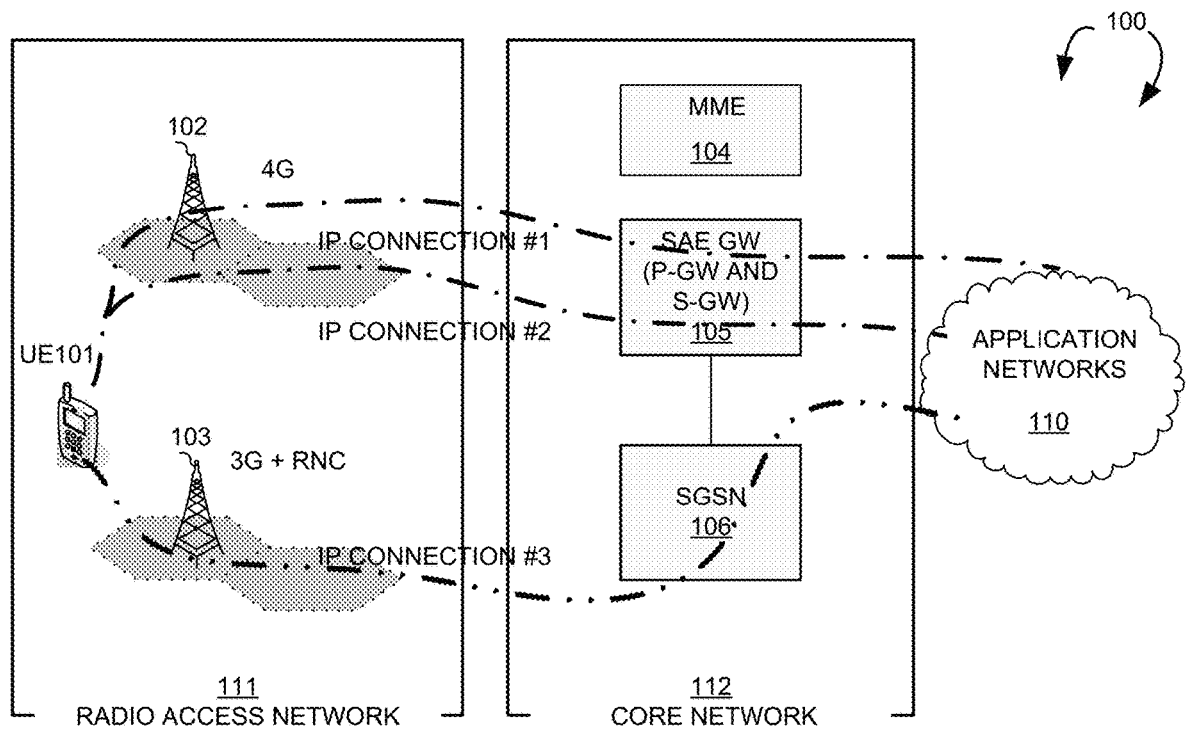
FIG. 1 illustrates an exemplary 3GPP wireless network with MTU size discovery for a user equipment (UE) in accordance with one novel aspect.

FIG. 1 illustrates an exemplary 3GPP wireless network with MTU size discovery for a user equipment (UE) in accordance with one novel aspect. 3GPP system 100 is a Public Land Mobile Network (PLMN) or an Equivalent Public Land Mobile Network (EPLMN) that supports one or more wireless radio access technology (RAT) networks, such a 4G/LTE system, a 3G system, and possibly a 2G system (not shown). Each of the 3GPP system has a fixed base infrastructure unit, such as wireless communications stations 102 and 103, forming wireless networks distributed over a geographical region. The base unit may also be referred to as an access point, an access terminal, a base station, a NodeB, an eNodeB, or by other terminology used in the art. Each of the wireless communications stations 102 and 103 serves a geographic area. A 4G/LTE system has a evolved node-B (eNodeB) 102 connecting with a system architecture evolution (SAE) gateway 105, which includes the serving gateway (S-GW) and the packet data network (PDN) gateway (P-GW). A 3G system has a node-B 103 and a radio network controller (RNC). The RNC of the 3G system connects with a serving GPRS support node (SGSN) 106, which is connected to SAE gateway 105.

A wireless communications device/user equipment (UE) 101 in 3GPP system 100 can be served by eNodeB 102 or by node-B 103 of the radio access network (RAN) 111 to access application networks or the Internet 110 through core network 112. UE 101 establishes a bearer with 3GPP system 100 for data services. UE 101 establishes EPS bearer in the 4G system via S1 interface, or establishes a PDP context in the 3G system via lu interface. For IP networks, the EPS bearer or PDP context is also referred to as a PDN or IP connection. In the example of FIG. 1, to establish an EPS bearer in the 4G system, UE 101 sends a PDN connectivity request to eNodeB 102. UE 101 may establish multiple PDN connections simultaneously, e.g., IP connection #1 and IP connection #2 as depicted. Alternatively, UE 101 may establish one or more PDN connections in the 3G system, e.g., IP connection #3 as depicted.

The EPS/IP bearer and connection management and allocation functionality can be provided towards the applications and the terminal devices using an Application Programming interface (API) based on Packet Data Protocol (PDP) contexts. A PDP context can be regarded as a data record of parameters that characterize a specific bearer and connection to the target PDN. Multiple applications running on one UE may require multiple connections to one or more PDNs, so that multiple PDP contexts may have to be defined. These multiple PDP contexts can be grouped into primary PDP contexts (also referred to as non-secondary PDP contexts) and secondary PDP contexts. Multiple primary PDP contexts provide connections to different PDNs are each associated with a unique IP address.

For external applications, the EPS/IP bearer and connection management and allocation functionality may be provided through an AT command API in accordance with 3GPP TS 27.007 "AT command set for User Equipment (UE)". AT commands are used for controlling Mobile Termination (MT) functions and GSM/UMTS network services from a Terminal Equipment (TE) through Terminal Adaptor (TA). In the example of FIG. 1, UE 101 comprises a TE, a TA, and an MT. TE can use AT commands to control MT to perform bearer and connection management and allocation functionality. For example, TE can use AT commands for querying PDP context information and for setting PDP context parameters. In accordance with one novel aspect, the PDP contexts comprises Maximum Transmission Unit (MTU) information. In communications networks, the MTU of a communication protocol of a layer is the size (in bytes or octets) of the largest protocol data unit that the layer can pass onwards. MTU parameters usually appear in association with a communications interface. In an IP network, IP packets may be fragmented if the supported MTU size is smaller than the packet length. Therefore, by introducing MTU information to the PDP contexts, TE can use AT commands to query MTU parameters from the network and thereby avoid fragmentation. TE can also use AT command to set MTU parameters and thereby control MTU discovery.

Figure 2:
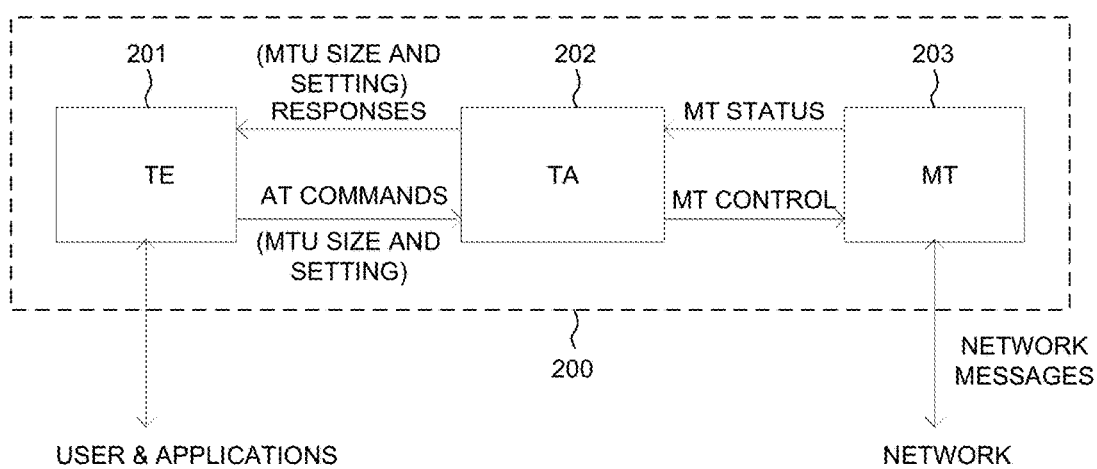
FIG. 2 illustrates a simplified block diagram of an architecture comprising a Terminal Equipment (TE) and a Mobile Termination (MT) interfaced by a Terminal Adaptor (TA) in accordance with one novel aspect.

FIG. 2 illustrates a simplified block diagram of an architecture of a user equipment UE 200 comprising a Terminal Equipment (TE 201) and a Mobile Termination (MT 203) interfaced by a Terminal Adaptor (TA 202) in accordance with one novel aspect. 3GPP TS 27.007 defines a plurality of AT commands for controlling MT functions and GPRS packet domain services based on PDP contexts. Each AT command includes a Context Identification (CID) parameter as reference to the specific PDP context (and the associated Radio Access Bearer (RAB)) to which the AT command applies. The TA, MT and TE may be implemented in the form of separate or integrated entities as needed. The span of control of the defined AT commands allows handling of any physical implementation that may lead to: TA, MT and TE as three separate entities; TA integrated under the MT cover, and TE implemented as a separate entity; TA integrated under the TE cover, and MT implemented as a separate entity; and TA and MT integrated under the TE cover as a single entity.

In the example of FIG. 2, the AT commands are observed on the link between TE 201 and TA 202. However, most of the AT commands exchange information about the MT, not about the TA. The Interface between TE 201 and TA 202 operates over existing serial cables, infrared link, and all link types with similar behavior. The interface between TA 202 and MT 203 is dependent on the interference within MT 203. In one embodiment, TE 201 sends an AT command to TA 202, which converts to an MT control to be sent to MT 203. The AT commands can be a read command for retrieving MTU size from MT 203, or a set command for setting MTU discovery options for MT 203. In response, MT 203 sends an MT status back to TA 202, which converts to a response to be sent to TE 201. The response can include MTU size and setting information.

Figure 3:
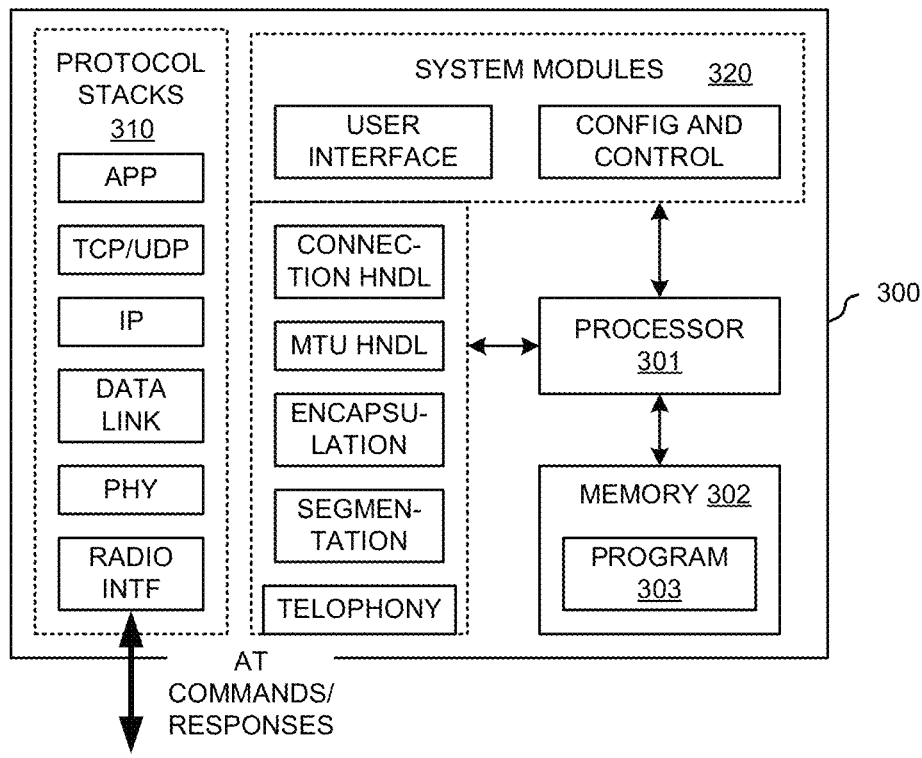
FIG. 3 illustrates a simplified block diagram of a Terminal Equipment (TE) in accordance with embodiments of the current invention.

FIG. 3 illustrates a simplified block diagram of a Terminal Equipment (TE 300) in accordance with embodiments of the current invention. TE 300 comprises a processor 301, memory 302, and protocol stacks 310 including Application (APP) layer, Transport (TCP/UDP) layer, Network (IP) layer, Data Link layer, and Physical (PHY) layer. TE 300 further comprises system control modules 320 including a user interface, a configuration and control module, a connection handler, a MTU handler, an encapsulation module, and a segmentation module. Processor 301 processes different applications and invokes different system control modules to perform various features of TE 300. Memory 302 stores program instructions and data 303 to control the operations of TE 300. The system control modules are circuits that can be implemented and configured to carry out functional tasks of TE 300.

For IP data service, TE 300 establishes one or multiple PDN connections to its target PDN. Upon PDN connection establishment, application data needs to be encapsulated and segmented at each layer, from higher layer to lower layer (e.g., TCP→IP→Data Link), and then transmitted in the PHY layer. For example, application data is first encapsulated with TCP/UDP header in transport layer (e.g., TCP or UDP packets), and then encapsulated with IP header and segmented based on MTU size at network layer (e.g., IP packets). The TCP layer may also segment the application data based on Maximum Segmentation Size (MSS) derived from MTU. The above functionalities are handled by the connection handler, the MTU handler, the encapsulation module, and the segmentation module, together with the protocol stacks 310. Typically, TE 300 is also equipped with telephony framework circuits (e.g., a dialer, a call manager etc.) to support voice call functionality. In addition, TE 300 also supports the AT commands as defined by 3GPP TS27.007 for controlling MT functions and GPRS packet domain services based on PDP contexts, which includes MTU information for each PDN connection identified by CID.

Figure 4:
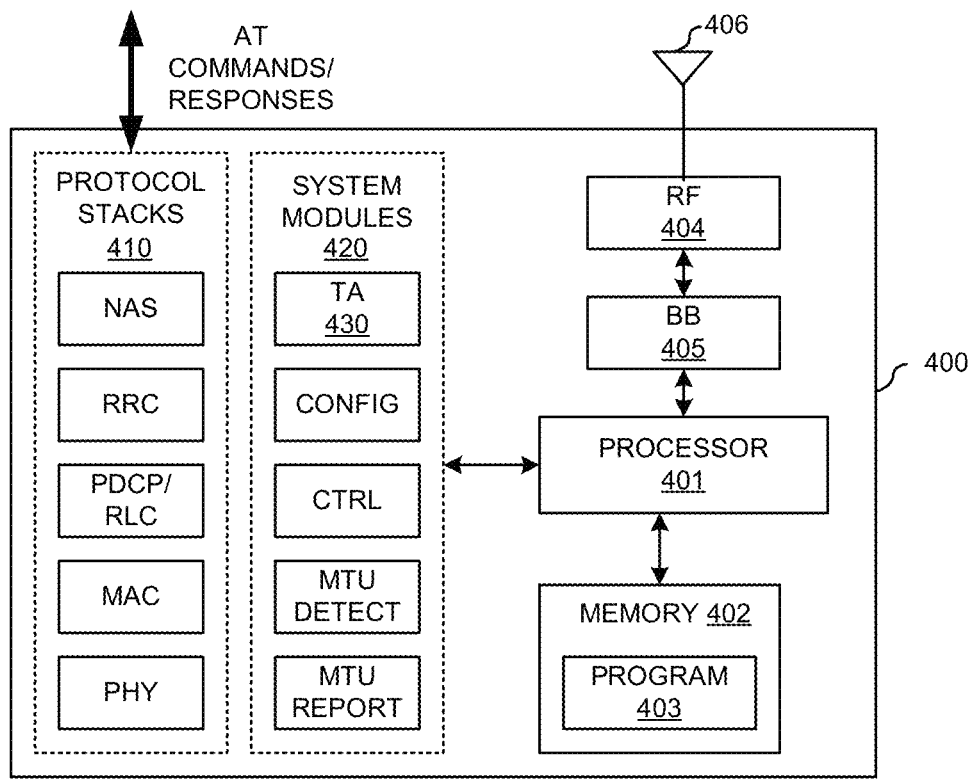
FIG. 4 illustrates a simplified block diagram of a Mobile Termination (MT) in accordance with embodiments of the current invention.

FIG. 4 illustrates a simplified block diagram of a Mobile Termination (MT 400) in accordance with embodiments of the current invention. MT 400 has an antenna 406, which transmits and receives radio signals. A RF transceiver module 404, coupled with the antenna, receives RF signals from antenna 406, converts them to baseband signals and sends them to processor 401 via baseband module 405. RF transceiver 404 also converts received baseband signals from processor 401 via baseband module 405, converts them to RF signals, and sends out to antenna 406. Processor 401 processes the received baseband signals and invokes different functional modules to perform features in MT 400. Memory 402 stores program instructions and data 403 to control the operations of MT 400.

MT 400 also comprises a set of protocol stacks 410 and control circuits including various system modules 420 to carry out functional tasks of MT 400. Protocol stacks 410 comprises Non-Access-Stratum (NAS) layer, Radio Resource Control (RRC) layer, Packet Data Convergence Protocol/Radio Link Control (PDCP/RLC) layer, Media Access Control (MAC) layer, and Physical (PHY) layer. System modules 420 comprises a configuration module, a control module, an MTU detector for discovering MTU size based on MTU discovery option, and an MTU reporting module for reporting MTU size and setting information. In the example of FIG. 4, MT 400 further comprises a Terminal Adaptor (TA 430) that receives and transmits AT commands and converts the AT commands to be processed by processor 401 for controlling MT functions. In one example, TA 430 receives an AT read command from a TE for the MT to retrieve MTU size from the network. In another example, TA 430 receives an AT set command from a TE for setting MTU discovery option such that the MT performs MTU discovery based on the MTU discovery option.

FIG. 5 illustrates one embodiment of an AT command +CGCONTRDP for acquiring a list of Packet Data Protocol (PDP) context parameters including MTU size for each IP connection associated with a context identification (CID) in accordance with one novel aspect. As illustrated in FIG. 5, the AT+CGCONTRDP command is a read or test command. The execution of the read command returns the relevant information for an active non-secondary PDP context with the context identifier <cid>. If the parameter <cid> is omitted in the AT command, then the relevant information for all active non-secondary PDP contexts is returned. The execution of the test command returns a list of <cid>s associated with active non-secondary PDP contexts.

The defined values of the relevant information include: <cid>: a particular non-secondary PDP context identifier; <bearer-id>: identifiers the EPS bearer; <apn>: a logical name that was used to select the packet data network; <local_addr and subnet_mask>: shows the IP address and subnet mask of the MT; <gw_addr>: shows the Gateway Address of the MT; <DNS_prim_addr>: shows the IP address of the primary DNS server; <DNS_sec_addr>: shows the IP address of the secondary DNS server; <P_CSCF_prim_addr>: shows the IP address of the primary P-CSCF server; <P_CSCF_sec_addr>: shows the IP address of the secondary P-CSCF server; <IM_CN_Signaling_Flag>: shows whether the PDN context is for IM CN subsystem-related signaling only or not; <LIPA_indication>: indicates that the PDP context provides connectivity using LIPA PDN connection; and <IPv4_MTU>: shows the IPv4 MTU size in octets.

FIG. 6 illustrates a message flow between a TE 601 and an MT 602 for querying MTU information by the TE. TE 601 is also referred to as an Application Processor (AP), while MT 602 is also referred to as a Modulator/Demodulator (modem). In step 611, the AP establishes a PDN connection with the network. This may happen when a UE is first tuned on and attaching to the network. The PDN connection is associated with a PDP context identifier (CID). In step 612, the AP sends an AT command +CGCONTRDP for acquiring a list of PDP context parameters including MTU size for the PDN connection associated with the CID. In step 613, the modem detects the MTU size of the PDN connection. The modem may have the default MTU size (e.g., 1500 byte). However, the modem typically needs to retrieve or discover the MTU size for the PDN connection. In step 614, the modem sends signaling to the network for discovery the MTU size. In step 615, the modem receives a response of the MTU size from the network. In step 615, the modem sends a response back to the AP in response to the AT command. The response comprises the PDP context parameters for the PDN connection including the newly retrieved or discovered MTU size. Note that step 612 may occur after steps 613-615. For example, after the PDN connection establishment in step 611, the modem will query the MTU size automatically (according to the MTU reporting setting by AT+CGDCONT), and the AP query for the MTU size afterward. In step 617, the AP process application data based on the MTU size. For example, the application data is first encapsulated with TCP/UDP header in transport layer (e.g., TCP or UDP packets), and then encapsulated with IP header and segmented based on MTU size at network layer (e.g., IP packets). The TCP layer may also segment the application data based on Maximum Segmentation Size (MSS) derived from MTU. Finally, in step 618, IP packets of the data application are exchanged between the AP and the network over the PDN connection.

Figure 7:
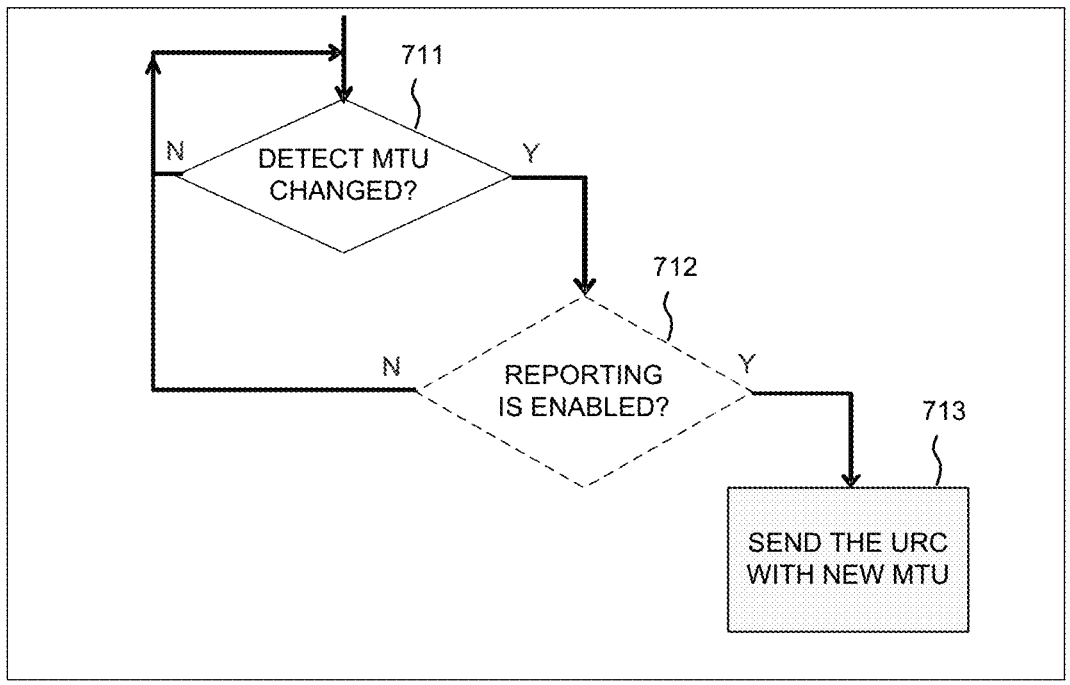
FIG. 7 illustrates a mechanism of reporting MTU information by an MT using Unsolicited Request Code (URC) upon detecting MTU size change.

FIG. 7 illustrates a mechanism of reporting MTU information by an MT using Unsolicited Result Code (URC) upon detecting MTU size change. For normal communication between TE and MT, TE will issue AT commands and MT will respond to the AT commands. URC is an exception. URC indicates the occurrence of an event not directly associated with issuance of any AT command from TE. Under URC, MT will actively report predefined events without any AT command from TE. As illustrated in FIG. 7, in step 711, an MT detects whether the MTU size has changed for a PDN connection. In step 712, the MT checks whether MTU reporting is enable or disabled. In step 713, if MTU reporting is enable, then the MT sends URC with the newly updated MTU size to the TE. Note the step 712 is optional and may be omitted.

Figure 8:
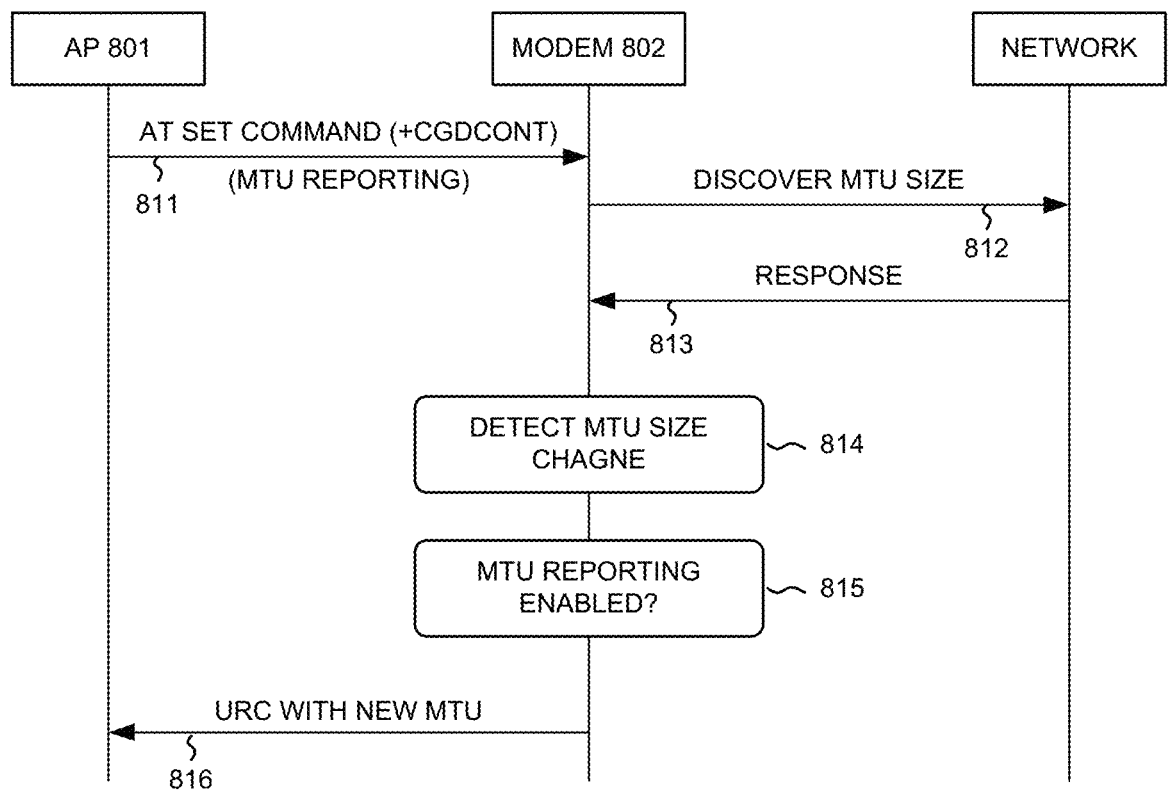
FIG. 8 illustrates a message flow between a TE and an MT for reporting MTU information by the MT.

FIG. 8 illustrates a message flow between a TE 801 and an MT 802 for reporting MTU information by the MT. TE 801 is also referred to as an Application Processor (AP), while MT 802 is also referred to as a Modulator/Demodulator (modem). In step 811, the AP sends an AT command enable or disable MTU reporting option (e.g., via AT+CGDCONT set command). In step 812, the modem sends signaling to the network for discovery the MTU size for a PDN connection. In step 813, the modem receives a response of the MTU size from the network. For example, the modem may periodically sends NAS signaling to a mobility management entity (MME) for newly updated MTU size. In step 814, the modem detects whether the MTU size has changed from a previous value of the same PDN connection. For example, the modem stores all the MTU sizes for each PDN connection in its memory. In step 815, the modem checks whether MTU reporting is enable or disabled. In step 816, if the MTU size has changed and if MTU reporting is enabled, then the modem sends URS with the newly update MTU size to the AP. Note that the modem reports the new MTU size using URC without receiving any specific AT command from the AP.

FIG. 9 illustrates one embodiment of an AT command +CGDCONT for setting/reading/testing a list of Packet Data Protocol (PDP) context parameters including MTU discovery option in accordance with one novel aspect. As illustrated in FIG. 9, the AT+CGDCONT command is a set or read or test command. The set command specifies PDP context parameters values for a PDP context identified by the local context identifier parameter <cid>, and also allows the TE to specify whether security protected transmission of ESM information is requested, because the PCO can include information that requires ciphering. There can be other reasons for the UE to use security protected transmission of ESM information, e.g., if the UE needs to transfer an APN. The number of PDP contexts that may be in a defined state at the same time is given by the range returned by the test command. The execution of the read command returns the current settings for each defined context. The execution of the test command returns values supported as compound values. If the MT supports several PDP types, <PDP_type>, the parameter value ranges for each <PDP_type> are returned on a separate line.

The defined values of the relevant information include: <cid>: specifies a particular PDP context definition; <PDP- _type>: specifies the type of packet data protocol; <APN>: a logical name that is use to select the packet data network; <PDP_addr>: identifies the MT in the address space applicable to the PDP; <d_comp>: controls PDP data compression; <h_comp>: controls PDP header compression; <IPv4AddrAlloc>: controls how the MT/TA requests to get the IPv4 address information; <request_type>: indicates the type of PDP context activation request for the PDP context; <P-CSCF_discovery>: influences how the MT/TA requests to get the P-CSCF address; <IM_CN_Signaling_Flag_Ind>: indicates to the network whether the PDP context is for IM CN subsystem-related signaling only or not; <NSLPI>: indicates the NAS signaling priority requested for this PDP context; <securePCO>: specifies if security protected transmission of PCO is requested or not; <IPv4_MTU_discovery>: influences how the MT/TA requests to get the IPv4 MTU size. If the MTU discovery option is set to 0, preference of IPv4 MTU size discovery is not influenced by +CGDCONT. If the MTU discovery option is set to 1, preference of IPv4 MTU size discovery is through NAS signaling.

Figure 10:
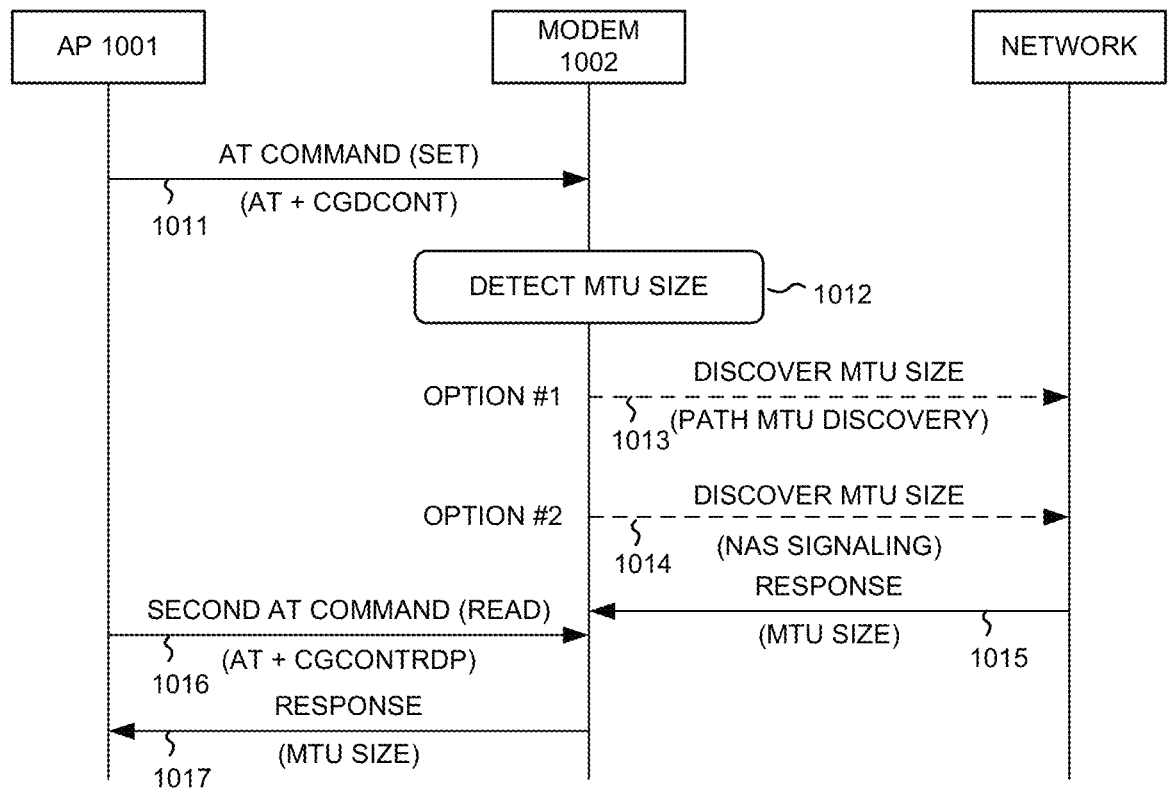
FIG. 10 illustrates a message flow between a TE and an MT for setting MTU discovery option by the TE.

FIG. 10 illustrates a message flow between a TE 1001 and an MT 1002 for setting MTU discovery option by the TE. TE 1001 is also referred to as an Application Processor (AP), while MT 1002 is also referred to as a Modulator/Demodulator (modem). In step 1011, the AP sends an AT command +CGDCONT for setting a list of Packet Data Protocol (PDP) context parameters including MTU discovery option. In step 1012, the modem tries to detect the MTU size based on the MTU discovery option set by the AP. If the MTU discovery option is set to 0, then the preference of IPv4 MTU size discovery is not influenced by +CGDCONT command. For example, in step 1013 (option #1), the default MTU discovery mechanism is through Path MTU Discovery mechanism. Path MTU discovery works by setting the DF (Don't Fragment) option in the IP headers of outgoing packets. Any device along the path whose MTU is smaller than the packet will drop such packets and send back an ICMP "Destination Unreachable" message containing its MTU. This information allows the source host to reduce its assumed path MTU appropriately. The process repeats until the MTU becomes small enough to traverse the entire path without fragmentation.

On the other hand, if the MTU discovery option is set to 1, then the preference of IPv4 MTU size discovery is through NAS signaling. Typically, the modem will try to discover the MTU size in the next proper NAS message (e.g., embedded in a Protocol Configuration Options (PCO) information element (IE)). For example, in step 1014 (option #2), the modem sends a PDN connectivity request to a mobility management entity (MME) of the network. In step 1015, the modem received the MTU size from the network via an activate PDP (or EPS bearer) context accept message or modify PDP (or EPS bearer) context request. In step 1016, the AP sends a second AT read command +CGCONTRDP for querying the MTU size. In step 1017, the modem sends the MTU size to the AP.

Figure 11:
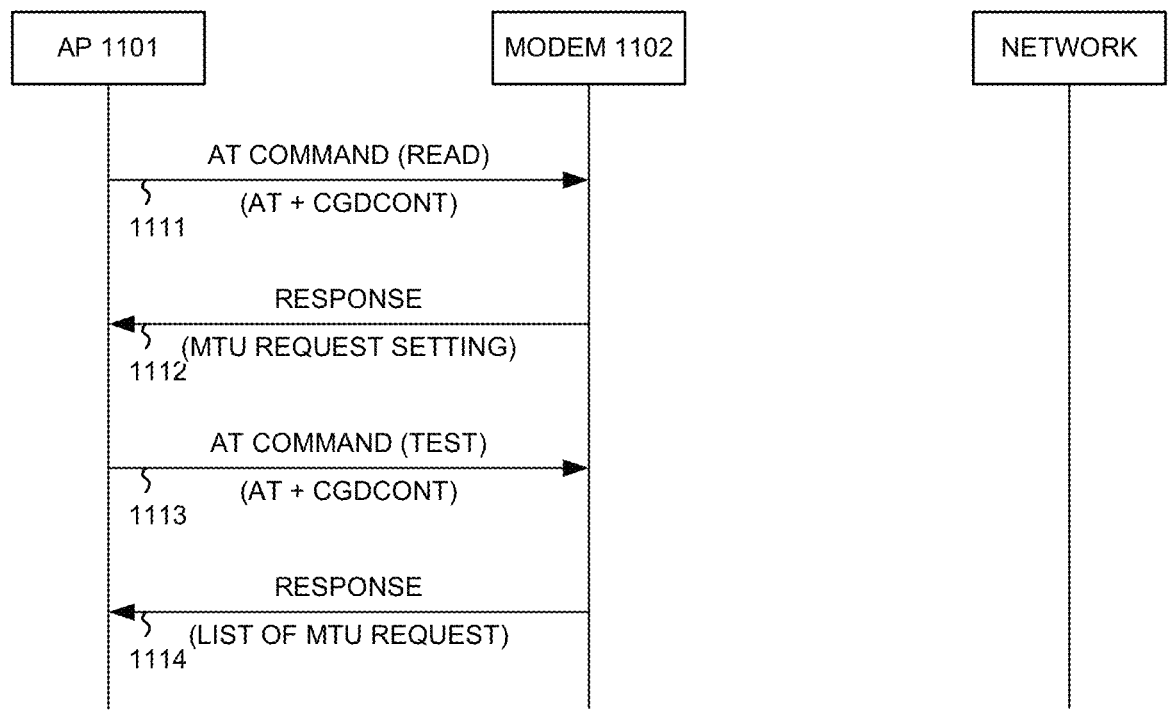
FIG. 11 illustrates a message flow between a TE and an MT for reading/testing MTU discovery option by the TE.

FIG. 11 illustrates a message flow between a TE 1101 and an MT 1102 for reading/testing MTU discovery option by the TE. TE 1101 is also referred to as an Application Processor (AP), while MT 1102 is also referred to as a Modulator/Demodulator (modem). In step 1111, the AP sends an AT read command +CGDCONT for reading a list of Packet Data Protocol (PDP) context parameters including MTU discovery option. In step 1112, the modem sends the list of Packet Data Protocol (PDP) context parameters including MTU discovery option back to the AP. In step 1113, the AP sends an AT test command +CGDCONT for testing supported Packet Data Protocol (PDP) context parameters including MTU discovery option. In step 1114, the modem sends the range of supported Packet Data Protocol (PDP) context parameters including the range of supported MTU discovery options back to the AP.

Figure 12:
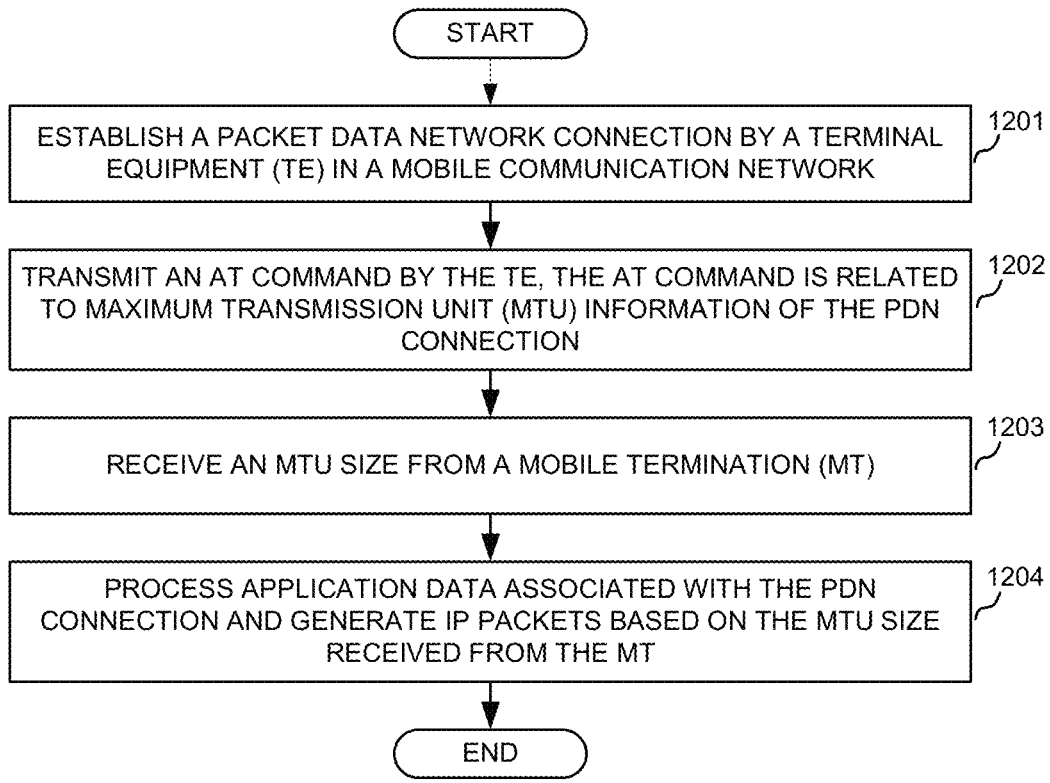
FIG. 12 is a flow chart of a method of controlling MTU reporting and discovery from TE perspective in accordance with one novel aspect.

FIG. 12 is a flow chart of a method of controlling MTU reporting and discovery from TE perspective in accordance with one novel aspect. In step 1201, a terminal equipment (TE) establishes a packet data network (PDN) connection in a mobile communication network. In step 1202, the TE transmits an AT command related to maximum transmission unit (MTU) information of the PDN connection. In step 1203, the TE receives an MTU size from a mobile termination (MT). In step 1204, the TE processes application data associated with the PDN connection and generates IP packets based on the MTU size received from the MT. Note that the order of steps 1201 and 1202 can be exchanged. For example, AT+CGDCONT set command can be used to configure the PDP context profile, the TE can setup the PDP context profile first and then establish the PDN connection. The setting of MTU query and reporting option can be set before PDP context is established, or after the PDP context is established.

Figure 13:
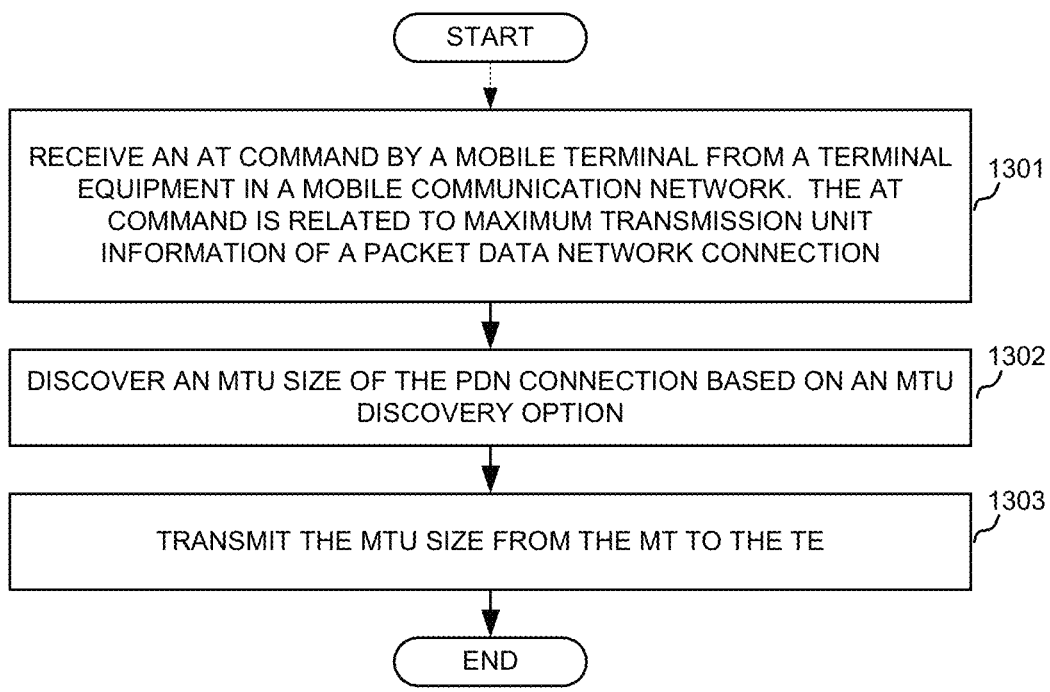
FIG. 13 is a flow chart of a method of controlling MTU reporting and discovery from MT perspective in accordance with one novel aspect.

FIG. 13 is a flow chart of a method of controlling MTU reporting and discovery from MT perspective in accordance with one novel aspect. In step 1301, a mobile termination (MT) receives an AT command from a terminal equipment (TE) in a mobile communication network. The AT command is related to maximum transmission unit (MTU) information of a packet data network (PDN) connection. In step 1302, the MT discovers an MTU size of the PDN connection based on an MTU discovery option. In step 1303, the MT transmits the MTU size from the MT to the TE. Note that if the AT command is a read command (+CGCONTRDP), then the order of steps 1301 and 1302 may be exchanged. If the AT command is a set command (+CGDCONT), then the MT transmits the MTU size in response to a second AT read command (+CGCONTRDP).

Figure 14:
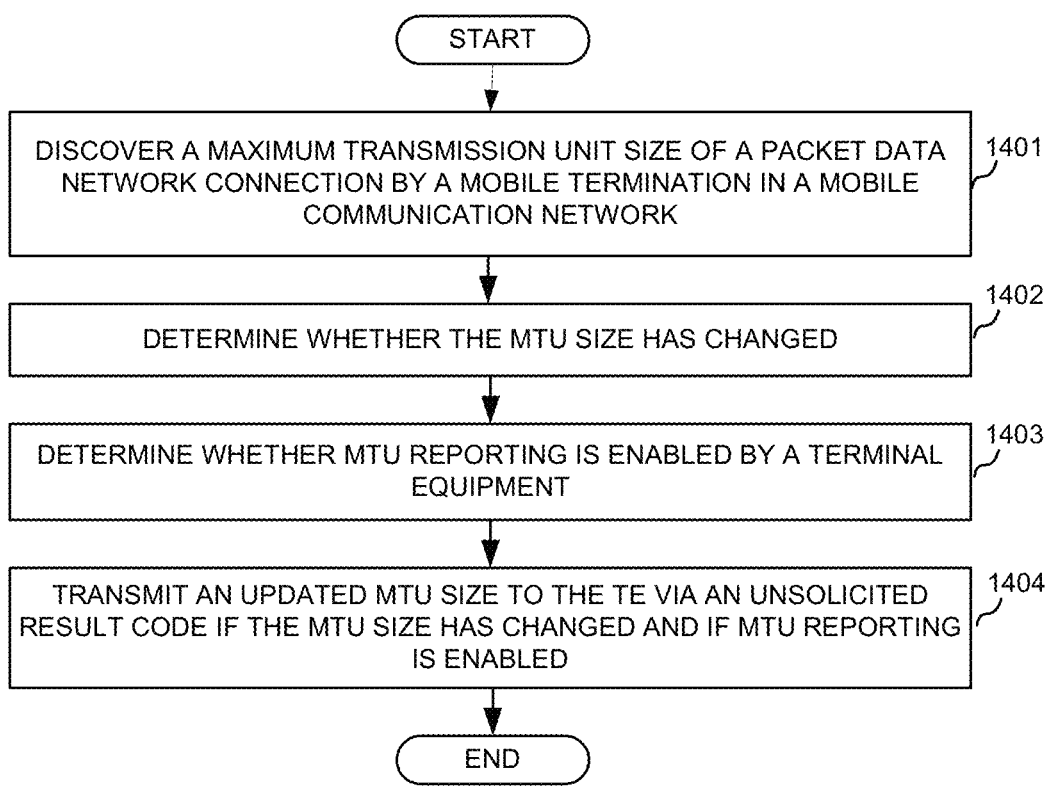
FIG. 14 is a flow chart of a method of reporting MTU information by an MT using Unsolicited Request Code (URC) upon detecting MTU size change.

FIG. 14 is a flow chart of a method of reporting MTU information by an MT using Unsolicited Result Code (URC) upon detecting MTU size change. In step 1401, a mobile termination (MT) discovers a maximum transmission unit (MTU) size of packet data network (PDN) connection in a mobile communication network. In step 1402, the MT determines whether the MTU size has changed. In step 1403, the MT determines whether MTU reporting is enabled by a terminal equipment (TE). In step 1404, the MT transmits an updated MTU size to the TE via an unsolicited result code (URC) if the MTU size has changed and if MTU reporting is enabled by the TE.

Figure 15:
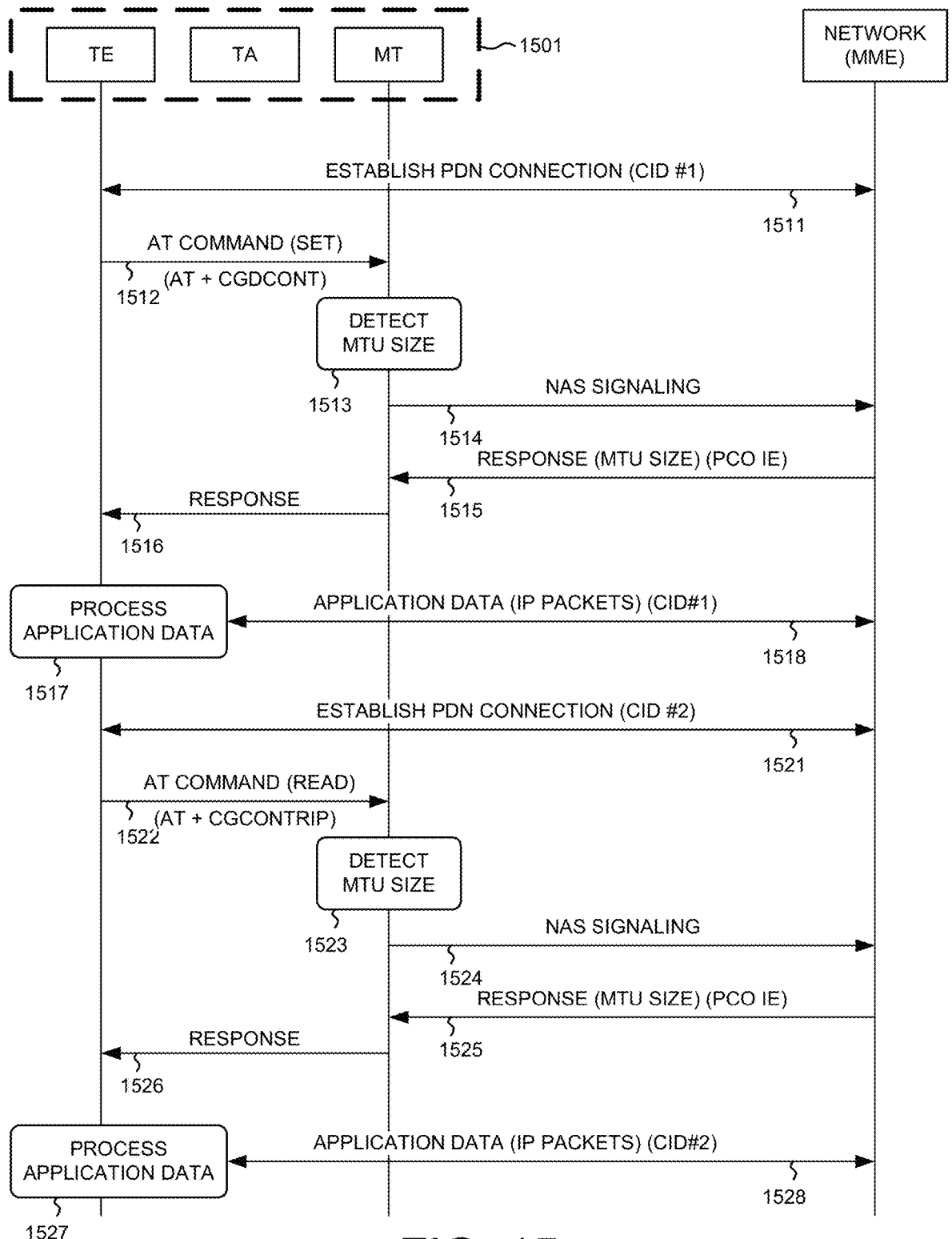
FIG. 15 illustrates a user equipment with MTU reporting and discovery using AT commands between an AP and a modem in accordance with one novel aspect.

FIG. 15 illustrates a user equipment with MTU reporting and discovery using AT commands between a TE and an MT in accordance with one novel aspect. UE 1501 comprises a terminal equipment, a terminal adaptor, and a mobile termination. The TE and MT communicate with each other via AT commands through the TA. In step 1511, UE 1501 establishes a PDN connection with its target PDN network, which is identified by a first CID #1. In step 1512, the TE sends an AT set command (+CGDCONT) to set a list of PDP context parameters including a preferred MTU discovery option. For example, the MTU discovery option is set to 1, indicating that NAS signaling is the preferred MTU discovery option. In step 1513, the MT detects the MTU size based on the MTU discovery option, e.g., through NAS signaling. In step 1514, the MT sends a NAS message for MTU size of CID #1. In step 1515, the MT receives a response with MTU size embedded in a PCO IE from the network. In step 1516, the MT forwards the MTU size to the TE. In step 1517, the application processor in the TE processes application data for subsequent data service. In one example, the application data is first encapsulated with TCP/UDP header in transport layer (e.g., TCP or UDP packets), and then encapsulated with IP header and segmented based on the received MTU size at network layer (e.g., IP packets). Finally, in step 1518, IP packets are exchanged between the TE and the network for the PDN connection with CID #1. Note AT+CGDCONT set command in step 1512 can be used to configure the PDP context profile. As a result, the TE can setup the PDP context profile first in step 1512 and then establish the PDN connection in step 1511. The setting of MTU query and reporting option can be set before PDP context is established, or after the PDP context is established.

UE 1501 may establish multiple PDN connections simultaneously, each associated with a different CID. For example, different PDN connections may correspond to different user applications for different purposes. Examples include PDN connection for Internet access, PDN for VoLTE. Different PDN connections may be served by different P-GW. For example, the P-GW of Internet PDN connection is located in the Internet domain, while the P-GW of VoLTE PDN connection is located in the internal IMS Core Network. In step 1521, UE 1501 establishes a PDN connection with its target PDN network, which is identified by a second CID #2. In step 1522, the TE sends an AT read command (+CGCONTRDP) to retrieve a list of PDP context parameters including a MTU size. In step 1523, the MT detects the MTU size based on the previously set MTU discovery option, e.g., through NAS signaling. In step 1524, the MT sends a NAS message for MTU size of CID #2. In step 1525, the MT receives a response with MTU size embedded in a PCO IE from the network. In step 1526, the MT forwards the MTU size to the TE. In step 1527, the application processor in the TE processes application data for subsequent data service. In one example, the application data is first encapsulated with TCP/UDP header in transport layer (e.g., TCP or UDP packets), and then encapsulated with IP header and segmented based on the received MTU size at network layer (e.g., IP packets). In step 1528, IP packets are exchanged between the TE and the network for the PDN connection with CID #2. Note that step 1522 may occur after steps 1523-1525. For example, after the PDN connection establishment in step 1521, the modem will query the MTU size automatically (according to the MTU reporting setting by AT+CGDCONT), and the AP query for the MTU size afterward.

Figure 16:
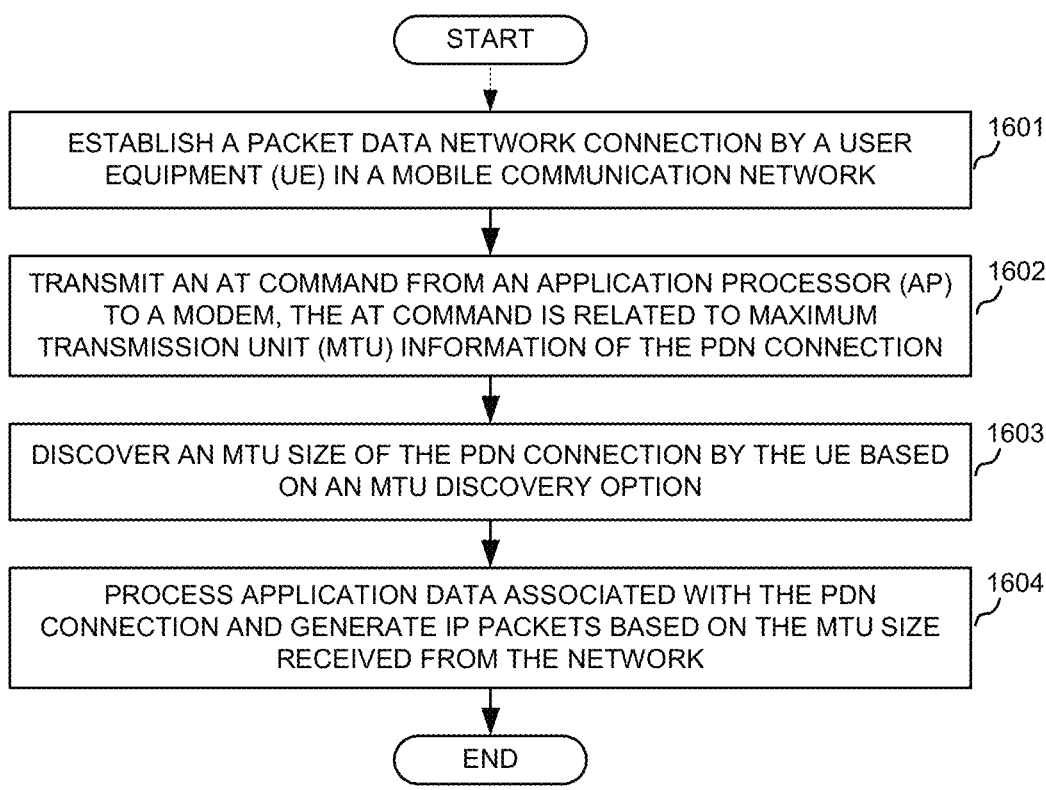
FIG. 16 is a flow chart of a method of controlling MTU reporting and discovery from UE perspective in accordance with one novel aspect.

FIG. 16 is a flow chart of a method of controlling MTU reporting and discovery from UE perspective in accordance with one novel aspect. In step 1601, a UE establishes a packet data network (PDN) connection in a mobile communication network. In step 1602, the UE transmits an AT command from an AP to a modem. The AT command is related to maximum transmission unit (MTU) information of the PDN connection. In step 1603, the UE discovers an MTU size of the PDN connection by the modem based on an MTU discovery option. In step 1604, the UE processes application data associated with the PDN connection and generates IP packets based on the MTU size received from the network.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
obtaining an Attention (AT) command by a mobile termination (MT) from a terminal equipment (TE) in a mobile communication network, wherein the AT command is related to maximum transmission unit (MTU) information of a packet data network (PDN) connection, and wherein the AT command is a set AT command initiated by the TE for setting a list of Packet Data Protocol (PDP) context parameters including an MTU discovery option;
discovering an MTU size of the PDN connection based on an MTU discovery option that indicates whether the TE prefers to discover the MTU size through a Non-Access-Stratum (NAS) signaling; and
providing the MTU size from the MT to the TE.

2. The method of claim 1, wherein the list of PDP context parameters comprises a context identification (CID), an EPS bearer ID, an access point name (APN), a local IP address, and the MTU size.

3. The method of claim 1, wherein the MT provides the MTU size in response to a second AT read command from the TE.

4. The method of claim 1, wherein the MTU discovery option is set to a first value for the MT to discover the MTU size via a Path-MTU-Discovery mechanism.

5. The method of claim 1, wherein the MTU discovery option is set to a second value for the MT to discover the MTU size via the Non-Access-Stratum (NAS) signaling.

6. The method of claim 5, wherein the NAS signaling involves the MT obtaining a Protocol Configuration Options (PCO) information element (IE) from a mobility management entity (MME).

7. A Mobile Termination (MT), comprising:
a processor that obtains an Attention (AT) command from a terminal equipment (TE) in a mobile communication network, wherein the AT command is related to maximum transmission unit (MTU) information of a packet data network (PDN) connection, and wherein the AT command is a set AT command initiated by the TE for setting a list of Packet Data Protocol (PDP) context parameters including an MTU discovery option;
an MTU detector that discovers an MTU size of the PDN connection based on an MTU discovery option that indicates whether the TE prefers to discover the MTU size through a Non-Access-Stratum (NAS) signaling; and
an MTU reporting circuit that provides the MTU size from the MT to the TE.

8. The MT of claim 7, wherein the list of PDP context parameters comprises a context identification (CID), an EPS bearer ID, an access point name (APN), a local IP address, and the MTU size.

9. The MT of claim 7, wherein the MT provides the MTU size in response to a second AT read command from the TE.

10. The MT of claim 7, wherein the MTU discovery option is set to a first value for the MT to discover the MTU size via a Path-MTU-Discovery mechanism.

11. The MT of claim 7, wherein the MTU discovery option is set to a second value for the MT to discover the MTU size via the Non-Access-Stratum (NAS) signaling.

12. The MT of claim 11, wherein the NAS signaling involves the MT obtaining a Protocol Configuration Options (PCO) information element (IE) from a mobility management entity (MME).

13. A method comprising:
discovering a maximum transmission unit (MTU) size of a packet data network (PDN) connection by a mobile termination (MT) in a mobile communication network;
determining whether the MTU size has changed;
determining whether MTU reporting is enabled by a terminal equipment (TE) via an Attention (AT) command for setting an MTU reporting option, wherein the AT command is also for setting an MTU discovery option that indicates whether the TE prefers to discover the MTU size through a Non-Access-Stratum (NAS) signaling; and
providing an updated MTU size to the TE via an Unsolicited Result Code (URC) if the MTU size has changed and if MTU reporting is enabled.

14. The method of claim 13, wherein the MT discovers the MTU size via a Path-MTU-Discovery mechanism.

15. The method of claim 13, wherein the MT discovers the MTU size via Non-Access-Stratum (NAS) signaling.

16. The method of claim 13, wherein the URC for the updated MTU size is provided to the TE without obtaining a preceding AT command for retrieving the MTU size.

17. A Mobile Termination (MT) comprising:
a maximum transmission unit (MTU) detector that discovers an MTU size of a packet data network (PDN) connection in a mobile communication network, wherein the MT determines whether the MTU size has changed;
a processor that determines whether MTU reporting is enabled by a terminal equipment (TE) via an Attention (AT) command for setting an MTU reporting option, wherein the AT command is also for setting an MTU discovery option that indicates whether the TE prefers to discover the MTU size through a Non-Access-Stratum (NAS) signaling; and
an MTU reporting circuit that provides the MTU size to the TE via an Unsolicited Result Code (URC) if the MTU size has changed and if MTU reporting is enabled.

18. The MT of claim 17, wherein the MT discovers the MTU size via a Path-MTU-Discovery mechanism.

19. The MT of claim 17, wherein the MT discovers the MTU size via the Non-Access-Stratum (NAS) signaling.

20. The MT of claim 17, wherein the URC for the updated MTU size is provided to the TE without obtaining a preceding AT command for retrieving the MTU size.

\* \* \* \* \*